Nov. 30, 1943.　　　J. F. MORSE　　　2,335,690
VARIABLE APERTURE SHUTTER
Filed Dec. 1, 1941
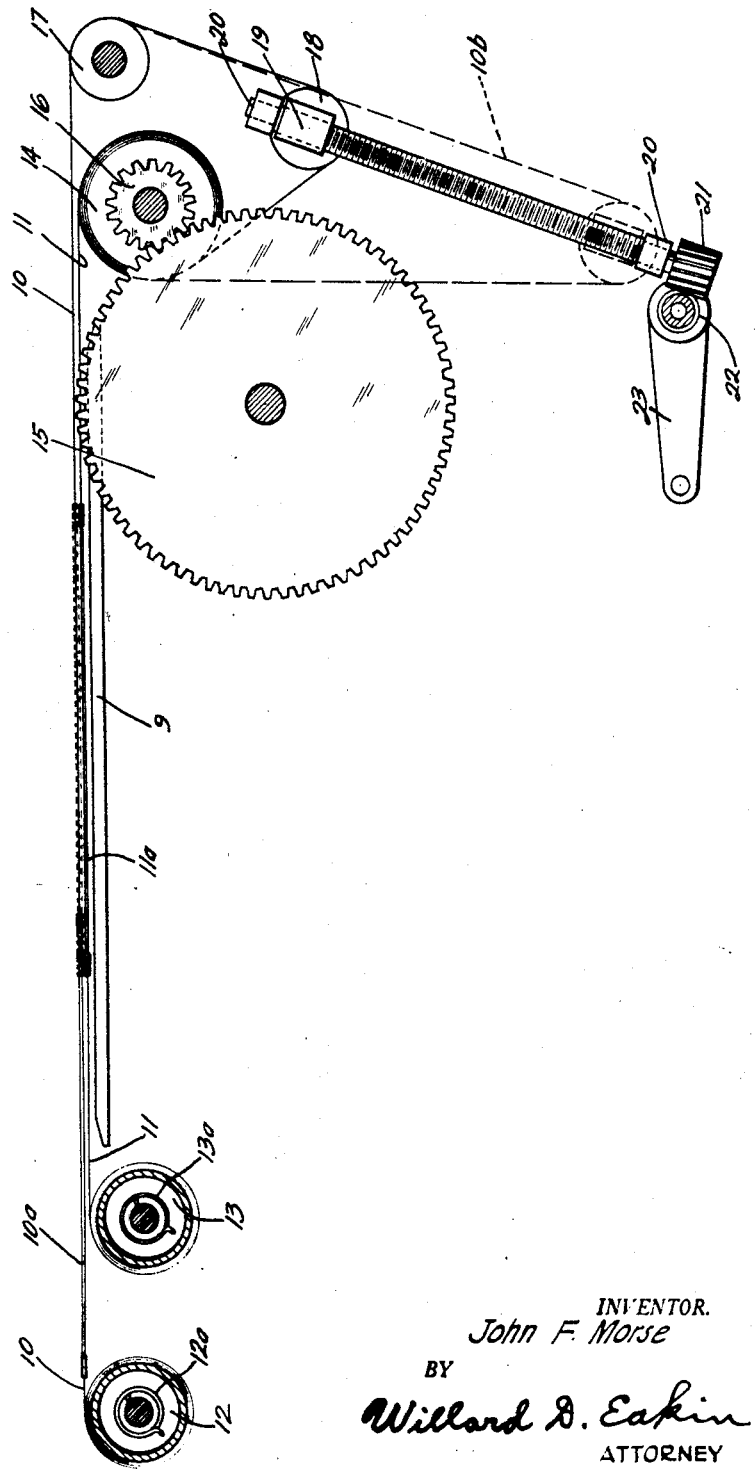
INVENTOR.
John F. Morse
BY
Willard D. Eakin
ATTORNEY

UNITED STATES PATENT OFFICE 2,335,690

VARIABLE APERTURE SHUTTER

John F. Morse, Hudson, Ohio

Application December 1, 1941, Serial No. 421,214

2 Claims. (Cl. 95—57)

This invention relates to variable-aperture focal plane shutters for use in cameras and the like.

Its chief objects are to provide a shutter adapted to be readily adjusted for variation of the size of the aperture; to provide dependable accuracy of operation; and to provide simplicity and economy of construction and repair.

Of the accompanying drawing, the single figure is a horizontal section of the shutter and its actuating mechanism.

In the drawing, 9 is a part of the camera upon which the shutter is mounted. The shutter comprises the usual parallel curtains 10 and 11 formed with respective apertures 10a and 11a and wound at their left-hand ends upon respective independent spring-wind rolls 12, 13, provided with wind-up springs 12a, 13a, which constantly urge the curtains toward the left as they are viewed in the figure.

At the right-hand side of the figure the two curtains are wound together upon a single wind-up roll 14 provided with the usual wind-up and trip mechanism inclusive of gears 15, 16 and the usual tripping latch and, if desired, an escapement (not shown).

For positioning the two curtains in such relation to each other that their apertured portions will overlap a little for a small effective light-transmitting aperture, or to a greater extent for a longer exposure, the outer apron, 10, is mounted upon a guide roll 17 having a fixed position and upon a shiftable guide roll 18 from which latter the apron passes tangentially onto the wind-up roll 14, preferably at a different position from that at which the other apron, 11, passes onto it, this arrangement providing a variable loop, 10b, in the outer curtain, 10, whereas the inner curtain, 11, has no such loop.

For convenience of construction and accuracy of adjustment the journal of the shiftable guide roller 18 has on its respective ends internally threaded sleeves, one of which is shown at 19, and each of these sleeves is mounted upon an externally threaded screw 20 which is rotatably mounted in end-brackets 20, 20 and has mounted on one of its ends a worm gear 21 meshed with a worm 22 which is provided with a hand-crank 23, so that the shiftable guide roll 18 is kept parallel with the other rolls while being shifted, by the turning of the crank 23, to vary the amount of the curtain 10 contained in the variable loop 10b.

Whatever relative positions the two curtains are given by shifting of the guide roll 19b are retained by them as they pass across the camera for the exposure, because they are necessarily let off of the wind-up roll 14 at substantially the same speed and are kept taut by the springs 12a, 13a of the wind-up rolls 12, 13 as they pass onto the latter respectively.

The advantages of the invention are indicated in the above statement of objects. Modifications are possible within the scope of the appended claims.

In the appended claims the expression "fully-extended" is used as meaning that neither of the curtain structures is folded backward upon itself or interlinked with the other curtain structure.

I claim:

1. A variable-aperture shutter comprising two fully-extended, overlapped curtain structures formed with respective margins which define a light-transmitting space, respective, constant-tension means individual to the curtain structures for running them in one direction, means for running them in the opposite direction against the force of said constant-tension means, and for letting them off at substantially the same speed, and, in association with the last said means, guide means for maintaining an adjustably variable loop in one of the curtain structures.

2. A variable-aperture shutter comprising two fully-extended, overlapped curtain structures formed with respective margins which define a light-transmitting space, constant-tension means for running them in one direction, the space-defining margins of said structures being shiftable with relation to each other against the force of said constant-tension means, means for running them in the opposite direction against the force of said constant-tension means and for letting them off at substantially the same speed, and, in association with the last said means, guide means for maintaining an adjustably variable loop in one of said curtain structures.

JOHN F. MORSE.